United States Patent
Quirk et al.

(10) Patent No.: US 10,938,920 B2
(45) Date of Patent: Mar. 2, 2021

(54) DATA MINING TO DETERMINE ASSET UNDER-UTILIZATION OR PHYSICAL LOCATION CHANGE

(71) Applicant: Xerox Corporation, Norwalk, CT (US)

(72) Inventors: Matthew John Quirk, Webster, NY (US); Peter J. Zehler, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 740 days.

(21) Appl. No.: 15/133,403

(22) Filed: Apr. 20, 2016

(65) Prior Publication Data

US 2017/0308585 A1    Oct. 26, 2017

(51) Int. Cl.
| | | |
|---|---|---|
| G06F 16/00 | (2019.01) | |
| H04L 29/08 | (2006.01) | |
| G06F 3/12 | (2006.01) | |
| G06Q 30/02 | (2012.01) | |
| G06Q 50/00 | (2012.01) | |

(52) U.S. Cl.
CPC ............ H04L 67/16 (2013.01); G06F 3/1203 (2013.01); G06F 3/1226 (2013.01); G06F 3/1273 (2013.01); G06F 3/1285 (2013.01); G06Q 30/0203 (2013.01); G06Q 50/00 (2013.01)

(58) Field of Classification Search
CPC .... G06F 3/1203; G06F 3/1226; G06F 3/1273; G06F 3/1285; G06Q 30/0203
See application file for complete search history.

(56) References Cited

U.S. PATENT DOCUMENTS

| | | | |
|---|---|---|---|
| 5,544,321 A | 8/1996 | Theimer et al. | |
| 5,555,376 A | 9/1996 | Theimer et al. | |
| 5,603,054 A | 2/1997 | Theimer et al. | |
| 5,960,167 A * | 9/1999 | Roberts | G06F 3/1294 358/1.15 |
| 6,658,586 B1 | 12/2003 | Levi | |
| 6,674,403 B2 | 1/2004 | Gray et al. | |
| 6,738,628 B1 | 5/2004 | McCall et al. | |
| 7,739,402 B2 * | 6/2010 | Roese | G01S 5/02 709/242 |
| 9,582,776 B2 * | 2/2017 | Apte | |
| 10,187,549 B2 * | 1/2019 | Zehler | H04N 1/4413 |
| 10,417,613 B1 * | 9/2019 | Brisebois | G06Q 10/1095 |
| 2005/0024201 A1 | 2/2005 | Culpepper et al. | |
| 2005/0076034 A1 * | 4/2005 | Addonisio | G06F 17/30289 |
| 2007/0176782 A1 | 8/2007 | Mohalik | |
| 2007/0185980 A1 | 8/2007 | Abraham et al. | |

(Continued)

OTHER PUBLICATIONS

Data mining—Wikipedia, the free encyclopedia, printed Apr. 5, 2016, 14 pages.

*Primary Examiner* — Jean M Corrielus
(74) *Attorney, Agent, or Firm* — Ortiz & Lopez, PLLC; Kermit D. Lopez; Luis M. Ortiz

(57) ABSTRACT

Methods and systems for identifying and locating assets. Data can be transmitted at regular intervals from a client to a server for processing by the server and stored in a database associated with the server. Such data characterizes the behavior of a user with respect one or more assets that communicate electronically with the server. Based on the data in the database, an indication of the status of the asset (or assets) can be determined. This indication is then utilized to assist in identifying and/or locating the asset.

20 Claims, 8 Drawing Sheets

(56) References Cited

U.S. PATENT DOCUMENTS

| | | | |
|---|---|---|---|
| 2008/0246986 A1* | 10/2008 | Scrafford | H04L 41/12 358/1.15 |
| 2009/0099897 A1* | 4/2009 | Ehrman | G06Q 10/06 705/7.15 |
| 2009/0099898 A1* | 4/2009 | Ehrman | G06Q 10/06 705/7.15 |
| 2010/0144383 A1* | 6/2010 | Berger | G06Q 50/265 455/521 |
| 2010/0145865 A1* | 6/2010 | Berger | G07B 15/00 705/307 |
| 2011/0153508 A1* | 6/2011 | Jhunjhunwala | G06Q 30/02 705/306 |
| 2011/0184979 A1 | 7/2011 | Apparao et al. | |
| 2012/0084357 A1 | 4/2012 | Richards et al. | |
| 2012/0158454 A1* | 6/2012 | Saunders | G06Q 10/0635 705/7.28 |
| 2012/0258731 A1 | 10/2012 | Smith et al. | |
| 2013/0132285 A1 | 5/2013 | Richards et al. | |
| 2013/0166461 A1* | 6/2013 | Austin | G06Q 50/184 705/310 |
| 2014/0081680 A1* | 3/2014 | Telle | G06Q 10/063 705/7.11 |
| 2014/0095264 A1* | 4/2014 | Grosz | G06F 3/1242 705/7.36 |
| 2014/0096037 A1* | 4/2014 | Grosz | G06F 3/1242 715/753 |
| 2014/0297563 A1* | 10/2014 | Jhunjhunwala | G06Q 30/02 705/36 R |
| 2015/0309159 A1 | 10/2015 | Boerhout | |
| 2015/0339339 A1* | 11/2015 | Mastrodonato | G06F 16/2358 707/805 |
| 2015/0379840 A1 | 12/2015 | Jackson | |
| 2016/0066137 A1 | 3/2016 | Kulkarni et al. | |
| 2016/0077769 A1 | 3/2016 | LaVigne et al. | |
| 2016/0078695 A1* | 3/2016 | McClintic | G07C 5/0816 701/29.4 |
| 2016/0080432 A1 | 3/2016 | Seferian et al. | |
| 2018/0121433 A1* | 5/2018 | Nevrekar | G06F 17/3053 |
| 2018/0255443 A1* | 9/2018 | Arena | G06Q 10/0832 |

\* cited by examiner

Example Survey Form

The printer ABIX at location XYZ that you have sent jobs to and seem to have notified you as to what has happend The printer ABCD is still available and I am no longer using it The printer ABCD has been turned off because of a problem that has not been fixed The printer ABCD has been moved to another locaton

DATA MINING TO DETERMINE ASSET UNDER-UTILIZATION OR PHYSICAL LOCATION CHANGE

TECHNICAL FIELD

Embodiments are generally elated to the field of asset tracking. Embodiments also relate to the field of data mining.

BACKGROUND

In many businesses and other organizations, assessing an office location and making placements of equipment based on the needs of customers and other users and expected print volume may be necessary to optimize organizational, operational, and other efficiencies. In some cases, such an assessment may be performed at the beginning of, for example, a service offering. Equipment is often owned completely or in part by a particular business, and customers may pay that business based on usage click counters. At the time of initial placement, offices can be evaluated and a map of an office location created.

Assets such as, for example, MFD's (Multi-Function Devices) can be placed at key locations and tracked on the asset map. The placement of this equipment, its ongoing service and maintenance, and its uses can be utilized to predict future revenue and "clicks" (e.g., user inputs) from a given customer. Typically movement of equipment is possible, but requires a Move, Add, Change, and Dispose (MACD) request to be made. Changes to location of equipment are carefully considered to maximize print availability, reduce waste, and offer the greatest flexibility. Currently, there is a need automate such MACD requests. Part of this automation requires an automatic indication when assets are moved.

If equipment becomes unavailable, or is used off the expected network, this may negatively affect the predetermined design during printer asset placement. In addition, it is possible that a capital asset becomes under-utilized or displaced without knowledge of, for example, a business or organization, thereby causing waste in resources and capital investments.

Furthermore, smaller and medium sized businesses typically are willing to spend less, but desire similar technological advantages offered to larger businesses. Where some businesses may be willing to place hardware (e.g., such as beacon technology) to help automate detecting printer movement, other businesses may not. Having a solution for both groups is advantageous to business, organizations, and customers and others users.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an, improved method and system for asset tracking.

It is another aspect of the disclosed embodiments to provide for an asset tracking method and system that includes data mining capabilities.

It is yet another aspect of the disclosed embodiments to provide for a data mining method and system for determining asset under-utilization or physical location change.

The aforementioned aspects and other objectives and advantages can now be achieved as described herein. Methods and systems are disclosed for identifying and locating assets. In an example embodiment, data is transmitted at regular intervals from a client to a server for processing by the server and stored in a database associated with the server. Such data characterizes the behavior of a user with respect to one or more assets that communicate electronically with the server. Based on the data in the database, an indication of the status of the asset (or assets) can be determined. This indication is then utilized to assist in identifying and/or locating the asset.

In another example embodiment, data mining of asset (e.g., printer) usage patterns can be employed to identify printers that may have moved, and automatically notify the appropriate parties including asset coordinators and service technicians. The usage patterns includes sending data at regular intervals from a client to a server that characterizes user's behavior and some MFD (Multi-Function Device) behavior for any given MFD. This data can then be stored on a server for later mining. The mining routine runs at regularly scheduled intervals. This routine looks at the behavior data and determines the possibility that a given piece of equipment has moved, added, changed, or disposed-of. If there is behavior that indicates a printer may have undergone one of these scenarios, a survey notification(s) is sent to one or more of the printers regular users. The notification includes or has a link to short surveys that asks the user about the state and location of the printer. Mining of the survey data occurs at regular intervals in a batch fashion, and this triggers notifications to either asset coordinators or service and support. These notifications may be automatic methods, emails, a business process, etc.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
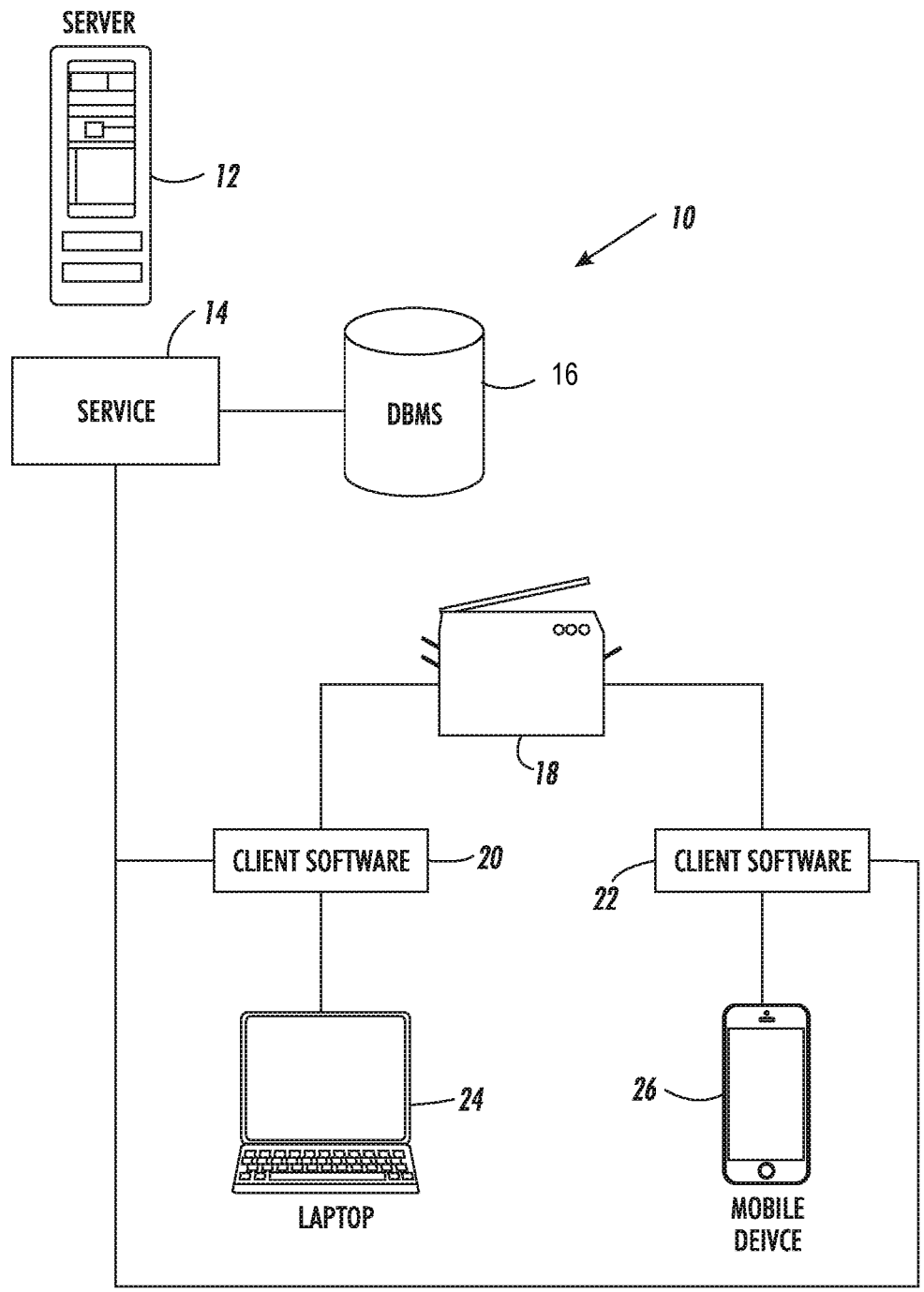
FIG. 1 illustrates a block diagram of a data mining system that can determine asset under-utilization and/or physical locator change, in accordance with an example embodiment.

The particular values and configurations discussed in these non-limiting examples can be varied and are cited merely to illustrate at least one embodiment and are not intended to limit the scope thereof.

For a general understanding of the present disclosure, reference is made to the drawings. In the drawings, like reference numerals have been used throughout to designate identical elements. In describing the present disclosure, the following term(s) have been used in the description.

The term "data" refers herein to physical signals that indicate or include information. An "image", as in a pattern of physical light or a collection of data representing the physical light, may include characters, words, and text as well as other features such as graphics. A "digital image" is by extension an image represented by a collection of digital data. An image may be divided into "segments," each of which is itself an image. A segment of an image may be of any size up to and including the whole image. The term "image object" or "object" as used herein is considered to be in the art generally equivalent to the term 'segment' and will be employed herein interchangeably.

In a digital image composed of data representing physical light, each element of data may be called a "pixel," which is common usage in the art and refers to a picture element. Each pixel has a location and value. Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image. Although described herein as continuous tone processing, the present invention applies equally as well to the processing of color images, where each separation is treated, effectively, as a gray scale or continuous tone image. Accordingly, references herein to the processing of continuous tone (contone) or gray scale images is intended to include the processing of color image separations as well. An operation performs "image pressing" when it operates on an item of data that relates to part of an image.

Within managed print services, there is an ongoing problem of tracking and managing moved equipment—and the movement or disabling of equipment often occurs without the business or organization being notified. Such assets (e.g., printers, MFD's, computers, and other equipment) are often optimally placed to control costs and offer the best overall services. The moving of equipment follows a process called Move, Add, Change, and Dispose (MACD). These change events assist in managing print services by maximizing the effectiveness of equipment placement at customer locations. There are many cases where customers move equipment arbitrarily without notifying the business or organization. Therefore, the tracking of these assets in an automatic way is very important. For example, in some cases, customers move printers to a closet temporarily because of the office is rearranged or remodeled.

The disclosed embodiments thus seek to use data mining of asset (e.g., printer, MFD, etc.) usage to identify assets that may have moved, and automatically notify the appropriate parties including asset coordinators and service technicians. The usage patterns include sending data at regular intervals from a client to a server that characterizes user's behavior and some asset behavior for any given asset. This data can then be stored on a server for later mining. A mining routine can run at regularly scheduled intervals. This routine looks at the behavior data and determines the possibility that a given piece of equipment has been Moved, Added, Changed, or Disposed-of. If there is behavior that indicates a printer may have undergone one of these scenarios, a survey notification(s) is sent to one or more of the printer's regular users. The notification includes or has a link to short surveys that asks the user about the state and location of the printer. Mining of the survey data occurs at regular intervals in a batch fashion, and this triggers notifications to either asset coordinators or service and support. These notifications may be automatic methods, emails, a business process, or some other similar method.

Note that as utilized herein the term "data mining" or "mining" can be utilized interchangeably to refer to the same task or operation. The term data mining as utilized herein refers generally to a computational process of discovering patterns in data sets in order to extract information from the data set and transform the data set into an understandable structure for further use. Data mining can include, for example, a raw analysis step and also aspects of database and data management, data pre-processing, model and inference considerations, interestingness metrics, complexity considerations, post-processing of discovered structures, visualization online updating, and so on. Data mining can be implemented as, for example, the analysis step of the "knowledge discovery in databases" process, or KDD.

FIG. 1 illustrates a block diagram of a data mining system 10 that can be implemented to determine asset underutilization and/or physical location change, in accordance with an example embodiment. In the example embodiment shown in FIG. 1, system 10 includes a server 12. A service 14 is associated with a database 16. Note that in the example embodiment depicted in FIG. 1, the database 16 can function as part of an RDBMS (Relational Database Management System).

System 10 further includes an asset 18 (e.g., a printer, MFD, computing equipment, etc) that can communicate with, for example, a computer 24 (e.g., a laptop computer, a desktop computer, another server, etc) and a mobile computing device 26 (e.g., a smartphone, tablet computing device, etc). Communication between the computer 24 and the mobile computing device 26 may be facilitated by, for example, client software 20 and client software 22, respectively. Although only a single asset 18 is shown in FIG. 1, it can be appreciated that multiple assets, such as a number of printers, MFD's, etc., may be placed at a particular business or organizational site. It can also be appreciated that even though a single server 12 is shown in FIG. 1, multiple servers can be implemented in the context of varying embodiments.

In an example scenario, a site can be reviewed for optimal asset placement. Planners can generate a site map to indicate where placements will be located. Service technicians can install the assets such as asset 18 at the predetermined locations. A user adds (or removes), for example, the printer or asset 18 and installs the driver. This action simultaneously adds the client application. Furthermore the client messages the server 12 at this time to track these events with an identifier (e.g., such as the mac address) to uniquely identify it.

As jobs are sent to a printer (e.g., asset 18), a client application tied to the print driver can send data about the jobs to the server 12 where the data can be stored in the database 16. For example, when a job completes, an instance of the client can send a message to the server 12 identifying the printer with timestamp information and that a print has completed. The data may have limited information about the print job itself or regarding any users that sent jobs to that printer.

The server 12 can be configured to run through a set of heuristics at regular intervals to determine if, for example, the asset 18 has possibly moved. If one of these heuristics determines the possibility of an asset being moved, then a push notification can be queued to send to any client applications that, for example, print to the identified printer.

Here are example heuristics of what the server 12 would look for:
  a. No users send print jobs to a printer within a given time span.
  b. One or more users experience errors when sending jobs to a given printer.
  c. A multiplicity of users deletes the printer.
  d. The IP subnet of the printer changes.
  e. The IP gateway of the printer changes.
  f. The printer sends a power off message and never sends a boot up message after X amount of time.
  g. The pool of users sending jobs to the printer significantly changes over time.
  h. A user changes the default printer.

Figure 6:
FIG. 6 illustrate a pictorial diagram of a sample GUI that displays a survey form, in accordance with an example embodiment.
Figure 6:
Figure 6:

For each user of the printer, the server 12 can send a message to the client application, which can trigger the client application to prompt the user with a survey (an example of which is shown in FIG. 6). The next time the user prints, the user can view a notification and receive a series of survey questions asking the user about the location and state of the printer. If the user identifies that the printer moved, then the client application can notify the server with the information contained in the survey.

The surveys can be then aggregated to determine the possibility of a MACD occurring. The aggregated surveys can trigger appropriate actions to either the individuals responsible for site and asset planning or a service technician to help resolve issues with the printer. Site planners can follow up with sites to determine the location of the printer asset as needed. Planners can revise the site map with the new information about the printer asset.

Figure 2:
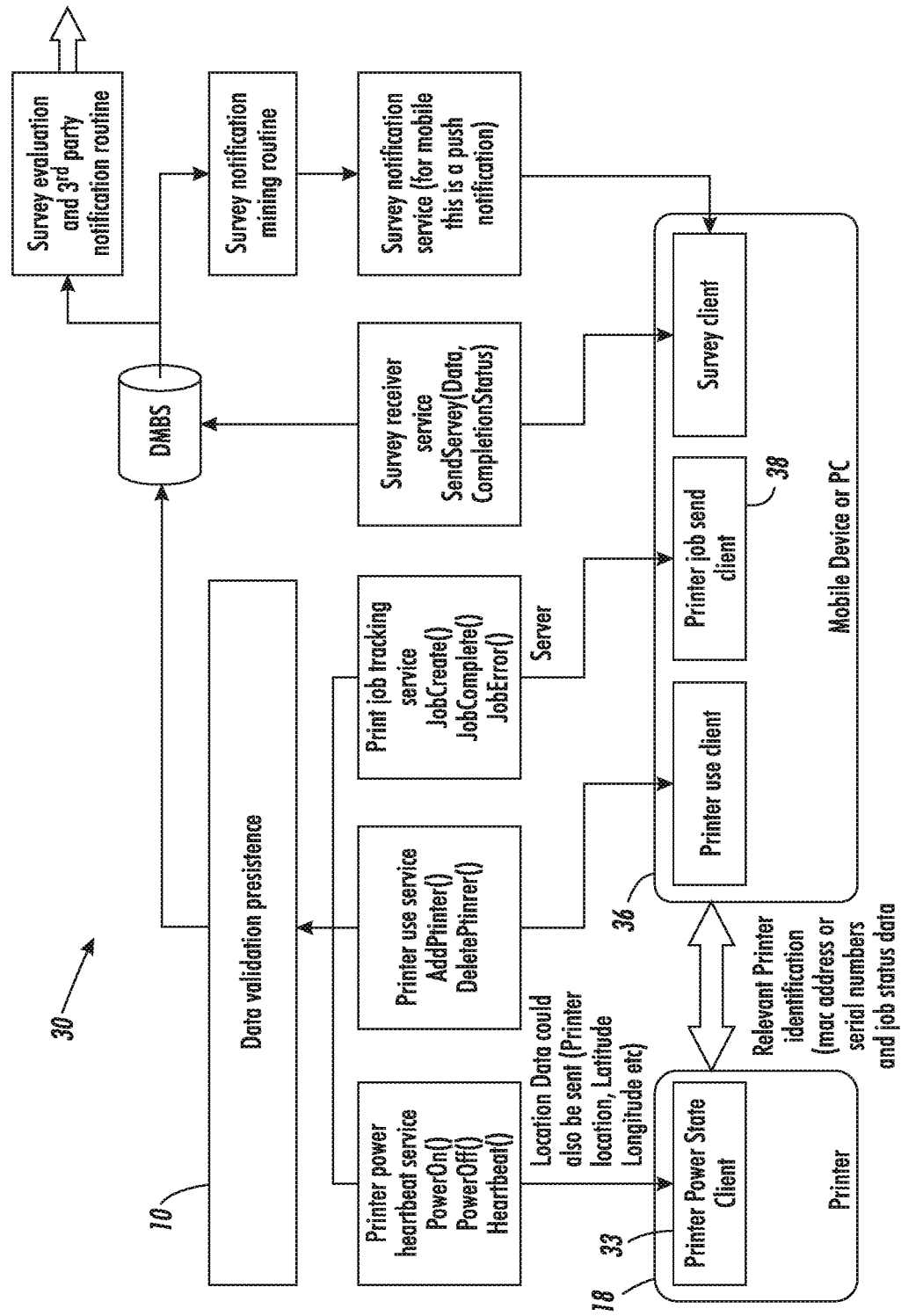
FIG. 2 illustrates a block diagram depicting a set of web services that can be implemented by a server as a means of receiving messages from clients in order to aggregate the data to a database, in accordance with an example embodiment.

FIG. 2 illustrates a block diagram 30 depicting a set of web services that can be implemented by server 12 as a means of receiving messages from clients in order to aggregate the data to the database 16, in accordance with an example embodiment. The diagram 30 shown in FIG. 2 illustrates client/service/routine software abstractions. The FIG. 2 diagram specifically shows the set of web services (or REST HTTP services) that may be implemented on a server such as server 12 as a means of receiving messages from clients in order to aggregate the data to the database. Furthermore, FIG. 2 shows where these services and clients would exist from the previous block diagram of system 10 depicted in FIG. 1.

Client data, and survey messages can be sent using, for example, TLS (1.0 or 1.1) encryption of the HTTP messages. This feature can make it more difficult to detect the existence of such a technology. It should be appreciated that although some embodiments may employ the use of HTTP messages, other embodiments may not. In any event, the data passed between client and server would avoid data that could potentially be private to a given user. For example, for a print job, the information in the job or any preferences about the job would not be sent. Three primary clients may send messages to a server and track the state. Two of these clients can exist and monitor jobs sent to printers (Printer Status Client 38). The third exists on the printer itself (Power State Client 33). Note that in FIG. 2, a block 36 is shown, which is representative of, for example, client devices such as the computer 24 and mobile computing device 26 shown in FIG. 1.

Clients existing primarily at the origin of print jobs would send data to a server that tracks behavior. In some cases, when drivers are installed, a print status client may also be installed. This situation can be modified to send status messages regarding, for example, a job creation, error states, and job completion status to the server 12 and aggregated in a DBMS system.

Clients on mobile devices (e.g., mobile device 26) or a desktop/laptop computer (e.g., computer 24) may have to retrieve pertinent information from the asset 18 (e.g., a MFD). At the very least, this data would need to include a way to uniquely identify the asset (e.g., such as the Mac Address).

When a printer driver or a client is first installed, the printer driver or the client can also notify the server 12 that it was added to the user's system. Additionally, the client may monitor the state of all assets/printers, determine when an asset/printer is removed from the user's system, and notify the server of this change. This client can also monitor the change in a user's default printer and notify the server when the default printer changes.

Printers can also be modified to notify the server of the power state of the printer (Power State Client). This can allow the server to know when a printer is no longer available. After a specified time interval, the server can trigger a survey notification to the user to ask about the state of the printer. During this process, the printer can also send important location data to the server 12 so that such location data can be stored and updated regularly.

Figure 3:
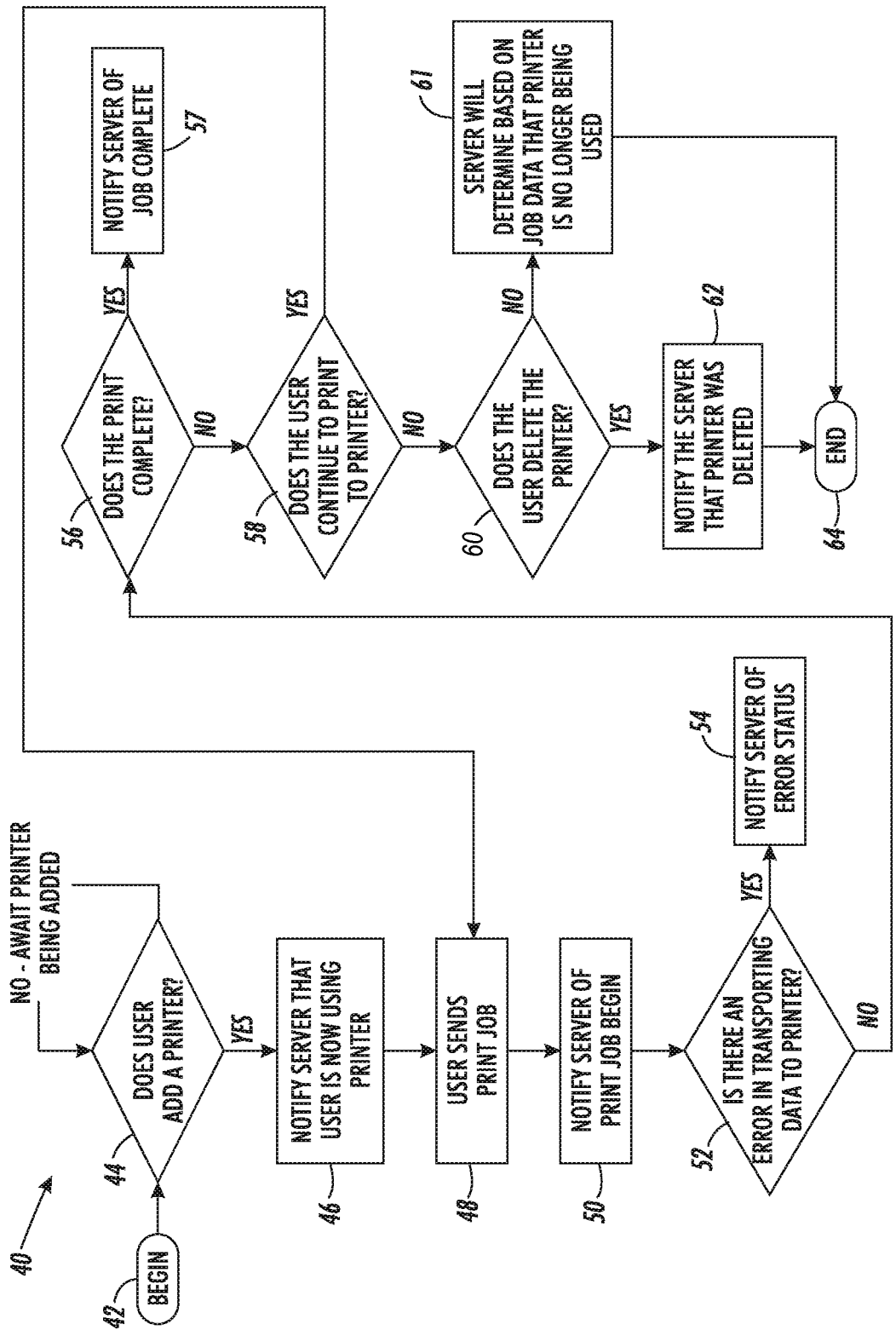
FIG. 3 illustrates a flow chart of operations depicting logical operational steps of a method for triggering printer status clients to send data to a server, in accordance with an example embodiment.

FIG. 3 illustrates a flow chart of operations depicting logical operational steps of a method 40 for triggering printer status clients to send data to a server (e.g., server 12), in accordance with an example embodiment. As indicated at block 42, the process begins. Then, as shown at decision block 44, a step or operation can be implemented to determine if a user has added a printer. If a user has not added a printer, then a command can be issued to await printer being added. If a printer has been added, then, the process continues. As indicated next at block 46, a step or operation can be implemented in which the server 12 is notified that the user is now using, for example, the asset 18 (e.g., printer, MFD, etc). As shown next at block 48, a step or operation can be implemented in which the user sends the print job and then, as depicted at block 50, a step or operation can be implemented in which the server 12 is notified that the print job has begun.

Thereafter, as indicated at decision block 52, a test can be performed to determine if there is an error in transporting data to the asset 18. If yes, then as shown at block 54, the server 12 is notified about the error state. If not, then the process continues. As depicted next at decision block 56, a test or operation can be performed to determine if the printing operation (i.e., the print job) has been completed. If so, the server 12 is notified of the completion of the print job, as indicated at block 57.

If not, then as depicted at decision block 58, a test or operation can be implemented to determine if the user continues to print to the printer or asset 18. If the answer is "yes," then the operation depicted at block 48 (i.e., user sends print job) is repeated and so on. Assuming the answer with respect to the test shown at block 58 is 'no,' then as shown at decision block 60, a test can be performed to determine if the user has deleted the printer or asset. If the answer is "no," then as shown at block 61, the server 12 can determine, based on job data, that the printer or asset 18 is no longer being used. Assuming the answer with respect to block 60 is "yes," then as indicated at block 62, the server 12 is notified that the printer or asset 18 was deleted. The process can then terminate as illustrated at block 64.

Figure 4:
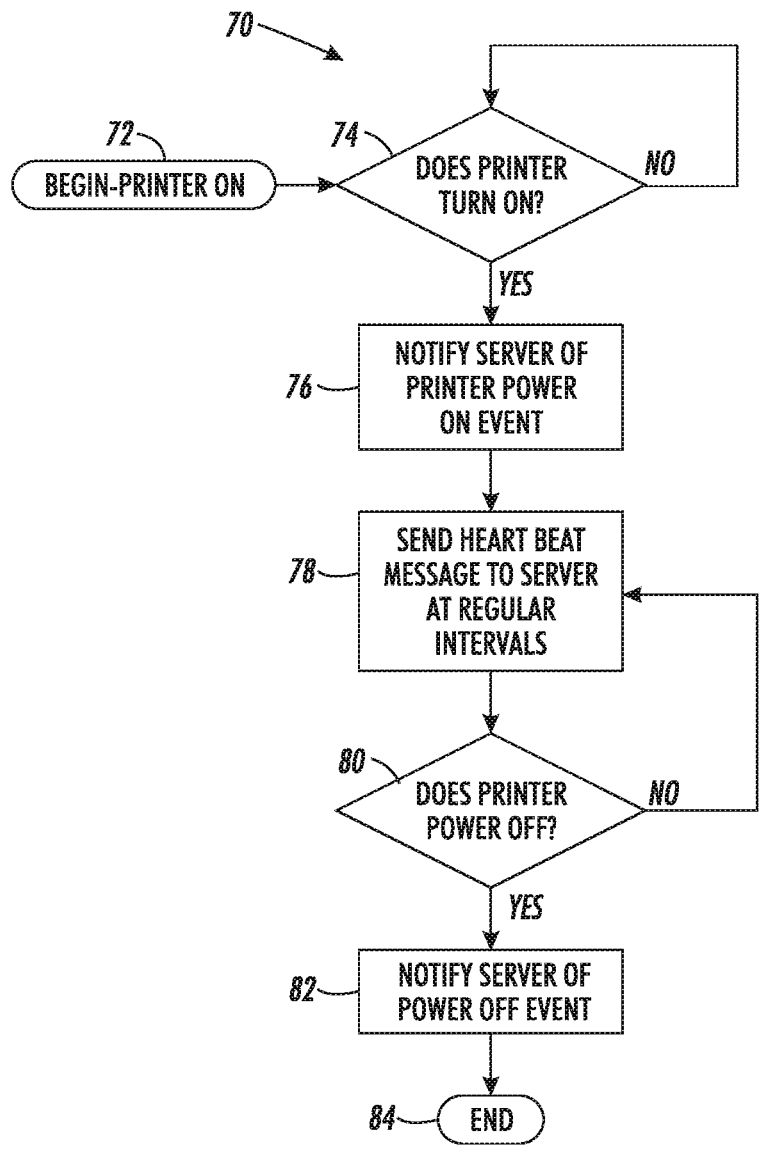
FIG. 4 illustrates a flow chart of operations depicting logical operational steps of a method for allowing a server to keep track of a power on/off status of a printer and for allowing the server to know when a given printer was off for an extended period, in accordance with an example embodiment.

FIG. 4 illustrates a flow chart of operations depicting logical operational steps of a method 70 for allowing a server to keep track of a power on/off status of the asset 18 and for allowing the server 12 to know when a given printer was off for an extended period, in accordance with an example embodiment. As shown at block 72, the process begins in which the asset or print is in an off state. Then, as depicted at decision block 74, a step or logical operational can be implemented to test whether or not the printer is turned off. If the answer is "yes," then as shown at block 76, a step or logical operation can be implemented to notify the server 12 of a printer power on event. Thereafter, as shown at block 78, a heartbeat message can be sent to the server 12 at regular intervals. Then, as indicated at decision block 80, a test can be performed to determine if the printer powers off. If so, then, as shown at block 82, the server 12 can be notified regarding a power off event. The process can then terminate, as shown at block 84.

The method 70 shown in FIG. 4 shows logic that can exist on an asset 18 (e.g., a printer, MFD, etc.) within a client application. This allows the server 12 to keep track of the power on/off status of the asset 18. In addition, this allows the server 12 to know when a given asset was off for an extended period.

Figure 5A:
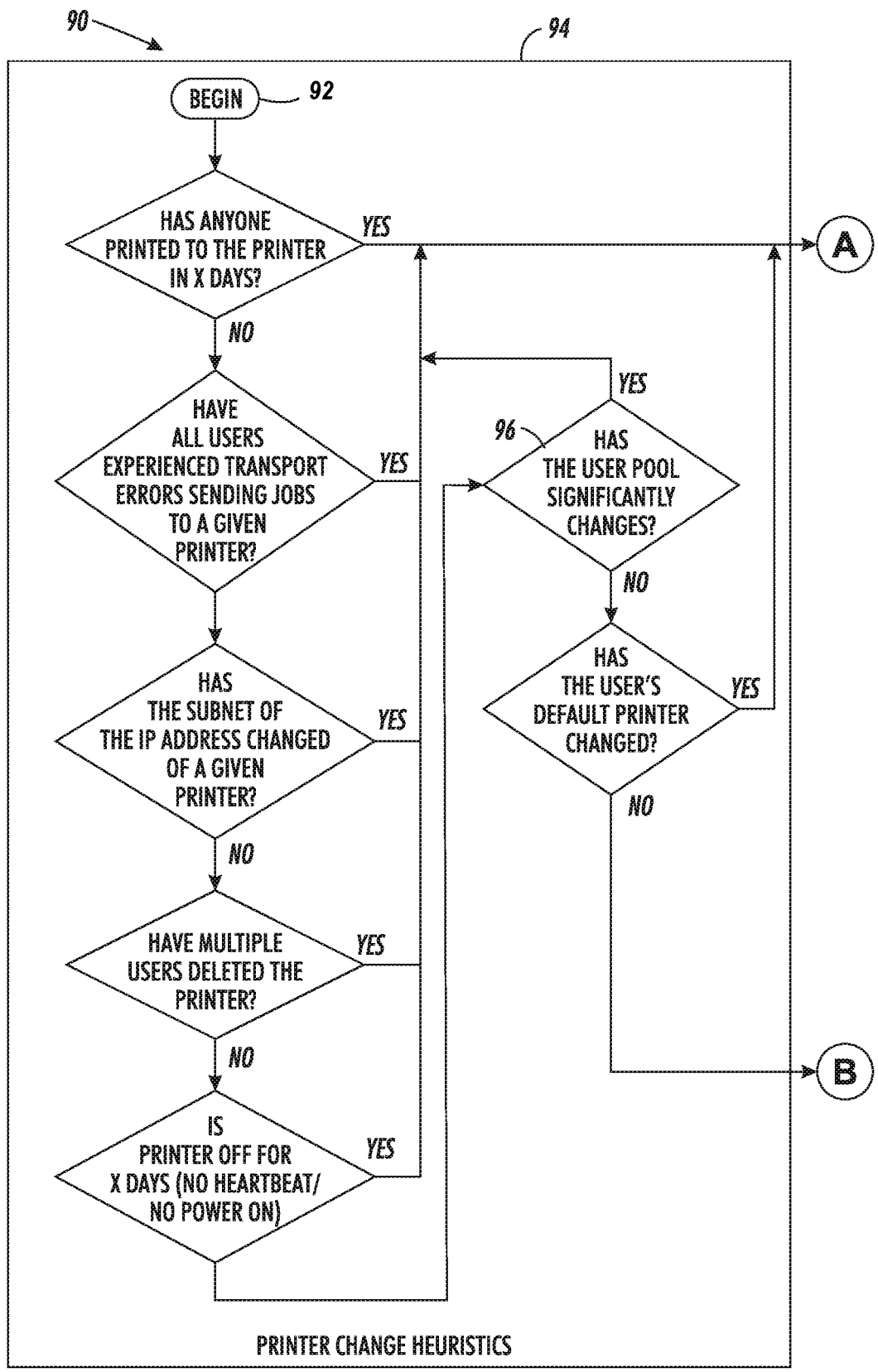
FIGS. 5A-5B illustrate a flow chart of operations depicting logical operational steps of a data mining method, in accordance with an example embodiment.
Figure 5B:
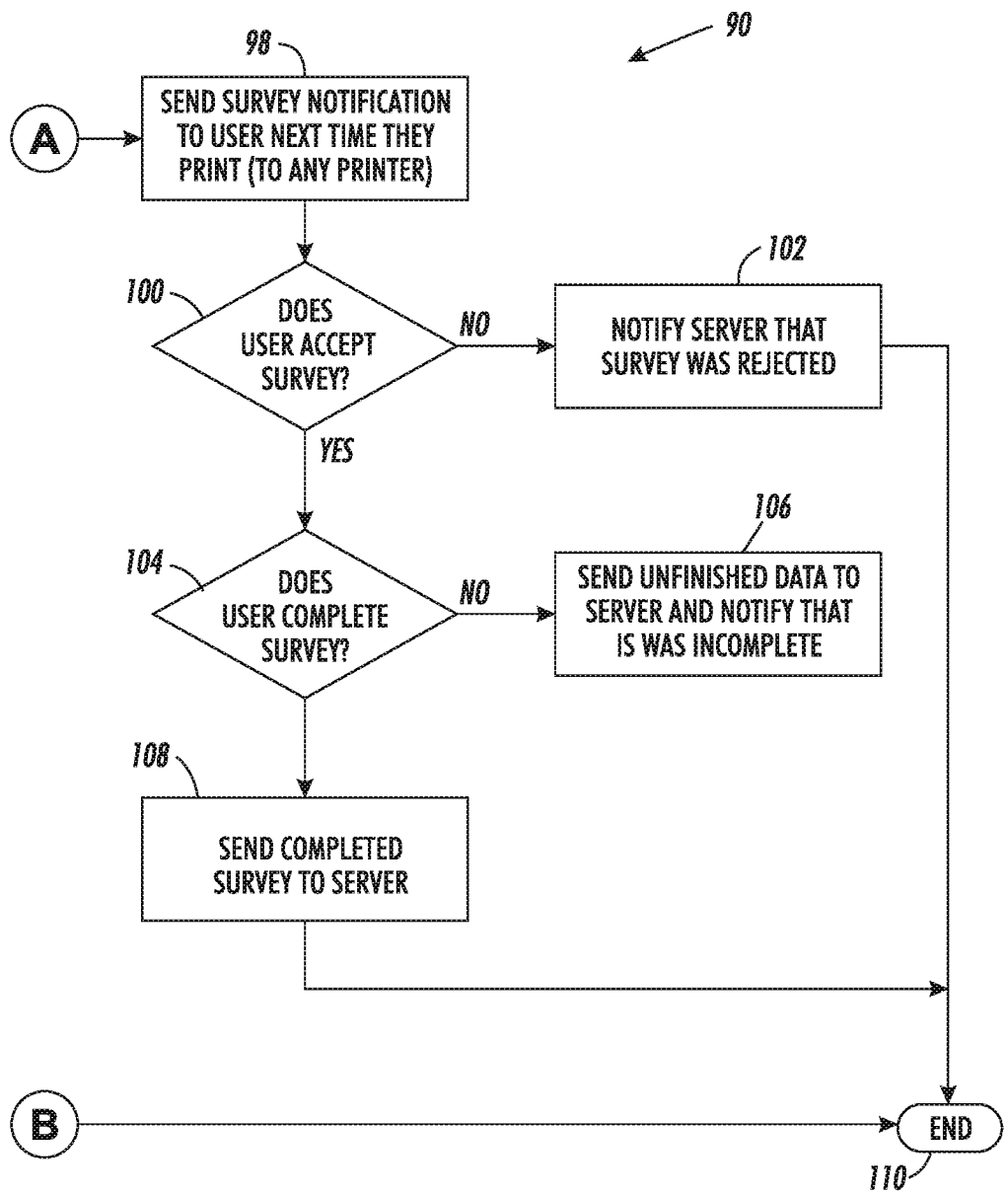

FIG. 5 illustrates a flow chart of operations depicting logical operational steps of a data mining method 90, in accordance with an example embodiment. The method 90 can be implemented as, for example, a mining routine. Such a mining routine can run at regular intervals and trigger notifications to query a user questions about the location of the asset 18.

As shown at block 92, the process can begin. Block 94 shown in FIG. 5 represents printer change heuristics. As indicated at decision block 96, a test can be performed to determine if the user pool has changed. If so, then as indicated at block 98, an electronic survey notification can be sent to a user the next time the user prints (e.g., to any printer). Thereafter, as shown at decision block 100, a test can be performed to determine if the user accepts such a survey. If not, then as depicted at block 102, the server 12 is notified that the survey was rejected. If so, then as depicted at decision block 104, a test is performed to determine if the user has completed the survey. If the user has not completed the survey, then as illustrated at block 106, the unfinished survey data is sent to the server 12 in association with a notification that the survey data is incomplete. However, if it is determined that the user did complete the survey, then as shown at block 108, the completed survey is sent to the server 12. The process then terminates, as shown at block 110.

The method 90 shown in FIG. 5 looks for a number of patterns. First, they may not have received any timestamp notifications of print jobs from other users within a given time span. This time span can be configured based on expected volume. When the data of print jobs is mined during the mining routine, it would determine that no print jobs have been sent to the printer over the specified time span. It would then trigger a survey to users.

Second, one or more users may experience errors when sending jobs to a given printer. Clients monitoring the status of the job can then notify the server 12 of the occurrence and type of the error. When the mining routine runs, it finds errors reported by multiple users, and triggers a survey notification to those users.

Third, the client can detect if a printer is deleted from the client system. During mining, the server 12 can determine if multiple users are performing this delete option on a given printer and trigger a survey to those users.

Fourth, the IP subnet of the printer may have changed. Fifth, the IP gateway of the printer may have changed. Sixth, the printer can send a power off message and never sends a boot up message after X amount of time. During mining, if the server 12 determines that systems have not been communicating power status for a pre-configured time span, it will trigger a survey to users of that printer.

Seventh, the pool of users sending jobs to the printer significantly changes over time. If user set 1 [e.g., users A, B, C] suddenly stops sending jobs to the printer and now e.g., users D, E, and F are the ones sending jobs, it indicates there is a possibility that the printer has moved. During the mining routine, if this is detected, the survey would send a survey to all associated users of the printer. Eighth, a user may change its default printer. In this case, the server 12 can then send a survey directly to that user.

FIG. 6 illustrates a pictorial diagram of a sample GUI (Graphical User Interface) 112 that can graphically display a survey form, in accordance with an example embodiment. The GUI 112 may include various icons, information banner, modules, interface elements, and the like. The GUI 112 allows a user to interact with electronic devices such as, for example, computer 24, mobile computing device 26, server 12, and so on through such graphical icons and visual indicators.

When certain user behaviors are detected, the survey's text and controls are generated to match those behaviors. The goal would be to provide simple forms with key verbiage ensuring maximum likelihood of the survey being filled out and with relevant data. Once the survey is complete, it is sent to the server in the form of a web service message or as some other similar method. The survey data is aggregated and associated with a particular printer for later mining.

Surveys can be sent and aggregated in the database 16 for later mining by the system 10. During the mining routine (e.g., see method 90), the possible types of MACD's can be identified. Notifications can then be sent to the relevant groups, or the appropriate triggering of a business process. An RDBMS (Relational Database Management System) can be queried for survey data. Other pertinent data related to the move can also be collected (such as where the printer was moved, if it is powered off, or doesn't function properly, etc.). The routine would then determine the appropriate group to send to and send it either as an email, client to a service, or other desirable notification method. The message can then trigger some business process function or at the least notify the interested party (either internally to the customer, to the business/organization, or both).

It can be appreciated that this approach offers a number of advantages. For example, an important advantage is that this is a low cost, technology-agnostic, data mining solution.

This approach does not rely on the extensive beacon-related technologies. Embodiments can detect a printer move, add, change, or dispose event, which is highly advantageous to the MPS business. Knowing that equipment has moved also benefits field engineers so that time is not wasted searching for equipment.

This approach also offers the potential for cost reduction. Here is a quantitative example of the size of the addressed problem: in the GCC west, asset coordinators spend about 65-70% of their time performing MACD's. They perform about 6000 of these per month at about 15 minutes per MACD and a burden rate of about $140 per hour. The potential for cost savings through this initial piece and furthermore if automated backend business processes are implemented are clear. In addition, there could theoretically be an increase in click count and supply usage because unofficial machine decommissions are detected.

As can be appreciated by one skilled in the art, embodiments can be implemented in the context of a method, data processing system, or computer program product. Accordingly, embodiments may take the form of an entire hardware embodiment, an entire software embodiment, or an embodiment combining software and hardware aspects all generally referred to herein as a "circuit" or "module." Furthermore, embodiments may in some cases take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, server storage, databases, etc.

Computer program code for carrying out operations of the present invention may be written in an object oriented programming language (e.g., Java, C++, etc.). The computer program code, however, for carrying out operations of particular embodiments may also be written in conventional procedural programming languages, such as the "C" programming language or in a visually oriented programming environment, such, as, for example, Visual Basic.

The program code may execute entirely on the user's computer, partly on the user's computer, as a stand-alone software package, partly on the user's computer and partly on a remote computer, or entirely on the remote computer. In the latter scenario, the remote computer may be connected to a user's computer through a local area network (LAN) or a wide area network (WAN), wireless data network e.g., Wimax, 802.xx, and cellular network, or the connection may be made to an external computer via most third party supported networks (for example, through the Internet utilizing an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 7:
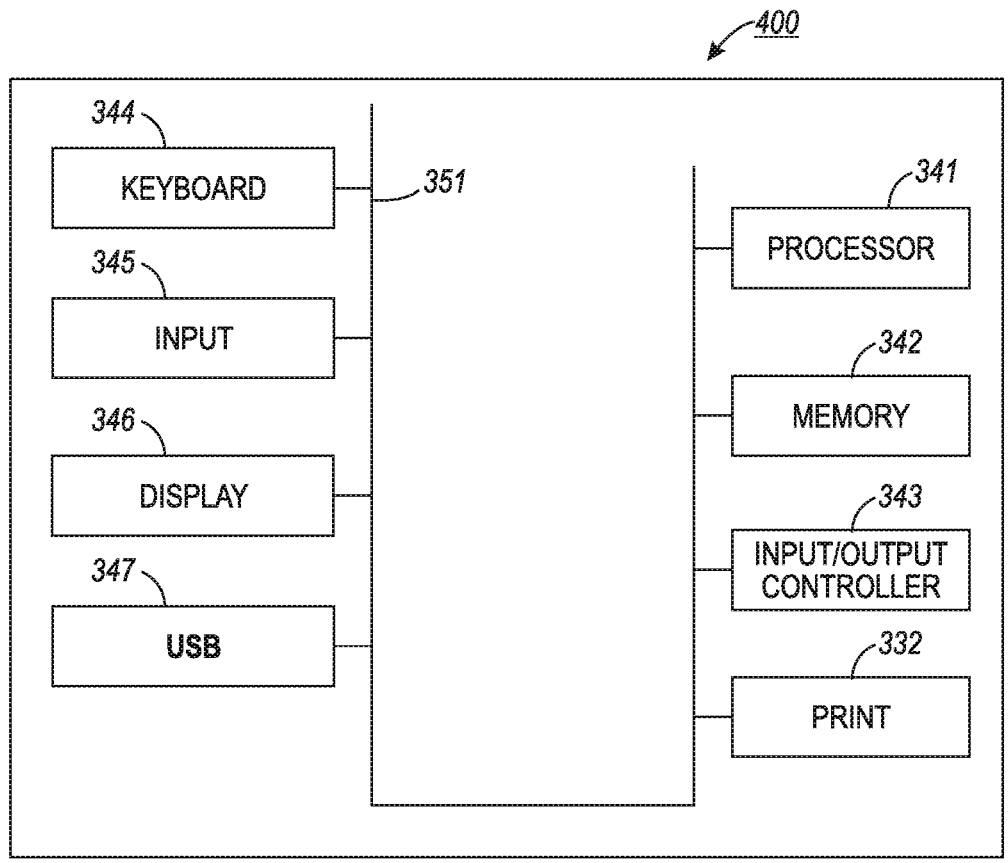
FIG. 7 illustrates a schematic view of computer system, in accordance with an embodiment.
Figure 8:
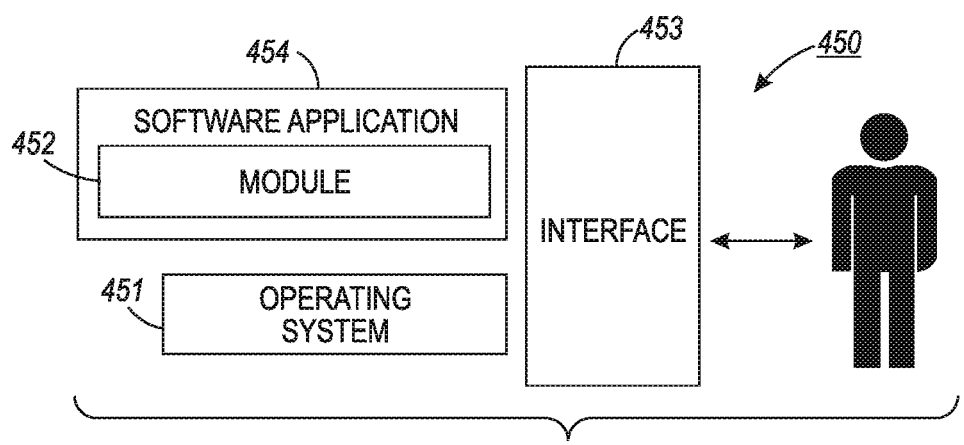
FIG. 8 illustrates a schematic view of a software system including a module, an operating system, and a user interface, in accordance with an embodiment.

FIGS. 7-8 are shown only as exemplary diagrams of data-processing environments in which embodiments may be implemented. It should be appreciated that FIGS. 7-8 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 7, some embodiments may be implemented in the context of a data-processing system 400 that can include one or more processors such as the processor 341, the memory 342, an input/output controller 343, a peripheral USB—Universal Serial Bus—connection 347, a keyboard 344, and/or another input device 345 (e.g., a pointing device, such as a mouse, track ball, pen device, etc.), a display 346, and in some cases, output 332 for rendering documents via a printer such as a printer asset.

As illustrated, the various components of data-processing system 400 can communicate electronically through a system bus 351 or similar architecture. The system bus 351 may be, for example, a subsystem that transfers data between, for example, computer components within data-processing system 400 or to and from other data-processing devices, components, computers, etc. Data-processing system 400 may be implemented in some embodiments as, for example, a server in a client-server based network (e.g., the Internet) or in the context of a client and a server (i.e., where aspects are practiced on the client and the server). In yet other example embodiments, data-processing system 400 may be, for example, a standalone desktop computer, a laptop computer, a Smartphone, a pad computing device, and so on, wherein each such device is operably connected to and/or in communication with a client-server based network or other types of networks (e.g., cellular networks, Wi-Fi, etc.).

FIG. 8 illustrates a computer software system 450 for directing the operation of the data-processing system 400 depicted in FIG. 7. Software application 454 stored, for example, in memory 342 generally includes a kernel or operating system 451 and a shell or interface 453. One or more application programs, such as software application 454, may be "loaded" (i.e., transferred from, for example, mass storage or another memory location into the memory 342) for execution by the data-processing system 400.

The data-processing system 400 can receive user commands and data through the interface 453; these inputs may then be acted upon by the data-processing system 400 in accordance with instructions from operating system 451 and/or software application 454. The interface 453 in some embodiments can serve to display results, whereupon a user 459 may supply additional inputs or terminate a session. Note that an example of interface 453 or a portion of such an interface is the GUI 112 shown in FIG. 6. The software application 454 can include module(s) 452, which can, for example, implement instructions or operations such as the various operations discussed herein with respect to FIG. 3, FIG. 4 and FIG. 5 and elsewhere herein. Such instructions/operations can be processed by, for example, the processor 341.

The following discussion is intended to provide a brief, general description of suitable computing environments in which, the system and method may be implemented. Although not required, the disclosed embodiments will be described in the general context of computer-executable instructions, such as program modules, being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application, such as a computer program designed to assist in the performance of a specific task, such as word processing, accounting, inventory management, etc. A module can include instructions to perform certain tasks, steps or operations such as those, for example, shown in FIGS. 3, 4, and 5 herein with respect to methods 40, 70, and 90. Other examples of modules include the client software 20, 22, and/or the service 14 depicted in FIG. 1. A module may also implement a GUI, such as the GUI 112 shown in FIG. 6.

FIGS. 7-8 are thus intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including Macintosh, UNIX, LINUX, and the like.

Based on the foregoing, it can be appreciated that a number of example embodiments are disclosed herein. For example, in one embodiment, a method for identifying and locating assets can include steps or operations such as transmitting data at regular intervals from a client to a server for processing by the server and storage in a database associated with the server, the data characterizing a behavior of a user with respect to one or more assets that communicate electronically with the server, determining based on the data in the database, an indication of a status of the asset, and utilizing the indication of the status to assist in identifying and/or locating the asset.

In some example embodiments, the aforementioned indication of the status of the asset can comprise an indication that the asset has been moved, added, changed, or disposed. The data in the database can be mined to assist in identifying and/or locating the asset. Such data to be mined can include, for example, a meter volume associated with the asset; a device remote alert associated with the asset; a change in network connectivity with respect to the asset; a change in a default status of the asset; and/or a recordable event associated with the asset.

In some example embodiments, if the aforementioned indication is determined, a survey notification can be transmitted to the user, which contains at least one electronic link to at least one survey with questions for the user concerning a state and a location of the asset, wherein survey data resulting from a completion and/or a partial completion of the at least one survey is mined for information identifying and/or locating the asset. In another example embodiment, steps or operations can be provided for mining the survey data at regular intervals in a batch fashion; and triggering a notification to an asset coordinator regarding with results of the mining of the survey data. Additionally, a step or operation can also be provided for incentivizing the user to complete the at least one survey.

In yet another embodiment, a system for identifying and locating assets can be configured which includes one or more processors and a computer-usable medium embodying computer program code. Such a computer-usable medium is capable of communicating with the processor (or processors). The computer program code can include instructions executable by the processor(s) and configured for: transmitting data at regular intervals from a client to a server for processing by the server and storage in a database associated with the server, the data characterizing a behavior of a user with respect to one or more assets that communicate electronically with the server; determining based on the data in the database an indication of a status of the asset and utilizing the indication of the status to assist in identifying and/or locating the asset.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

What is claimed is:

1. A method for identifying and locating assets in a system to improve a performance of said system, said method comprising:
    transmitting data at regular intervals from a client to a server for processing by said server and storage in a database associated with said server, said data transmitted at the regular intervals includes heuristics related to at least one asset of a system and information that characterizes a behavior of a user with respect to said at least one asset of said system, wherein said at least one asset communicates electronically with said server;
    determining based on said data in said database including said heuristics and said information that characterizes said behavior of said user, an indication of a status of said at least one asset, wherein said indication includes said status of said at least one asset based on said heuristics; and
    utilizing said indication of said status to assist in determining if said at least one asset is being under-utilized in said system and in improving a performance of said system and identifying and locating said at least one asset of said system, wherein said data in said database is mined by data mining to assist in said determining if said at least one asset is being under-utilized in said system and in said identifying and said locating of said at least one asset of said system, wherein said data mining comprises a computational process of discovering patterns in said data including data sets within said data for extraction of information from the data set and transformation of the data set into an understandable structure for further use;

when said indication is determined, transmitting to said user a survey notification containing at least one electronic link to at least one survey with questions in a graphically displayed survey form for said user concerning a state and a location of said at least one asset, wherein survey data resulting from a completion and/or a partial completion of said at least one survey is mined by said data mining for information that assists in said determining if said at least one asset is being under-utilized in said system and in said identifying and said locating of said at least one asset;

incentivizing said user to complete said at least one survey, wherein said at least one asset comprises at least one printer among a plurality of printers and wherein said heuristics include:

heuristics indicating that no users have sent print jobs to said at least one printer within a given time span;

heuristics indicating that one or more users of said at least one printer have experienced errors when sending print jobs to said at least one printer;

heuristics indicating that a group of users have deleted said at least one printer;

heuristics indicating that an IP subnet associated with said at least one printer has changed;

heuristics indicating that an IP gateway associated with said at least one printer has changed;

heuristics indicating that said at least one printer has sent a power off message and does not send a boot up message after a particular amount of time;

heuristics indicating that a pool of users sending print jobs to said at least one printer has significantly changed over a period of time; and heuristics indicating that at least one user has changed a default associated with said at least one printer.

2. The method of claim 1 wherein said heuristics include information regarding whether or not an IP subnet and an IP gateway associated with said at least one asset have been changed and wherein said indication of said status of said at least one asset comprises an indication that said at least one asset has been moved, added, changed, or disposed, which assists in said determining if said at least one asset is being under-utilized in said system.

3. The method of claim 1 wherein said at least one asset of said system further comprises computing equipment.

4. The method of claim 3 wherein said data mining comprises an analysis step of a Knowledge Discovery in Database (KDD) process and wherein said data to be mined includes:

a meter volume associated with said at least one asset;
a device remote alert associated with said at least one asset;
a change in network connectivity with respect to said at least one asset;
a change in a default status of said at least one asset; and
a recordable event associated with said at least one asset.

5. The method of claim 1 wherein said at least one asset comprises a multi-function device (MFD).

6. The method of claim 1 further comprising:
data mining of said survey data at said regular intervals in a batch fashion; and
triggering a notification to an asset coordinator regarding results of said mining of said survey data.

7. The method of claim 1 wherein said database comprises a database of a Relational Database Management System (RDBMS).

8. A system for identifying and locating assets in a system to improve the performance of said system, comprising:

at least one processor; and a computer-usable medium embodying computer program code, said computer-usable medium capable of communicating with said at least one processor, said computer program code comprising instructions executable by said at least one processor and configured for:

transmitting data at regular intervals from a client to a server for processing by said server and storage in a database associated with said server, where said data transmitted at the regular intervals includes heuristics related to at least one asset of a system and information that characterizes a behavior of a user with respect to said at least one asset of said system, wherein said at least one asset communicates electronically with said server;

determining based on said data in said database including said heuristics and said information that characterizes said behavior of said user, an indication of a status of said at least one asset, wherein said indication includes said status of said at least one asset based on said heuristics; and utilizing said indication of said status to assist in determining if said at least one asset is being under-utilized in said system and in improving a performance of said system and identifying and locating said at least one asset of said system, wherein said at least one asset comprises a printer and wherein said instructions are further configured for when said indication is determined, transmitting to said user a survey notification containing at least one electronic link to at least one survey in a graphically displayed survey form with questions for said user concerning a state and a location of said at least one asset, wherein survey data resulting from a completion and/or a partial completion of said at least one survey is mined for information that assists in said determining if said at least one asset is being under-utilized in said system and in said identifying and said locating of said at least one asset;

incentivizing said user to complete said at least one survey, wherein said at least one asset comprises at least one printer among a plurality of printers and wherein said heuristics include:

heuristics indicating that no users have sent print jobs to said at least one printer within a given time span;

heuristics indicating that one or more users of said at least one printer have experienced errors when sending print jobs to said at least one printer;

heuristics indicating that a group of users have deleted said at least one printer;

heuristics indicating that an IP subnet associated with said at least one printer has changed;

heuristics indicating that an IP gateway associated with said at least one printer has changed;

heuristics indicating that said at least one printer has sent a power off message and does not send a boot up message after a particular amount of time;

heuristics indicating that a pool of users sending print jobs to said at least one printer has significantly changed over a period of time; and heuristics indicating that at least one user has changed a default associated with said at least one printer.

9. The system of claim 8 further comprising an IP subnet and IP gateway associated with said at least one asset wherein said heuristics include information regarding whether or not said IP subnet and said IP have been changed and wherein said indication of said status of said at least one asset comprises an indication that said at least one asset has been moved, added, changed, or disposed, which assists in said determining if said at least one asset is being under-utilized in said system.

10. The system of claim 8 wherein said data in said database is mined by data mining to assist in said determining if said at least one asset is being under-utilized in said system and in said identifying and said locating of said at least one asset of said system, wherein said data mining comprises a computational process of discovering patterns in said data including data sets within said data for extraction of information from the data set and transformation of the data set into an understandable structure for further use.

11. The system of claim 10 wherein said database comprises an RDBMS (Relational Database Management System) database said system includes an RDBMS system associated with said RDBMS database, wherein said data mining comprises an analysis step of a Knowledge Discovery in Database (KDD) process, and wherein said data to be mined includes:

a meter volume associated with said at least one asset;

a device remote alert associated with said at least one asset;

a change in network connectivity with respect to said at least one asset;

a change in a default status of said at least one asset; and a recordable event associated with said at least one asset.

12. The system of claim 8 wherein said at least one asset comprises a multi-function device (MFD).

13. The system of claim 12 wherein said instructions are further configured for:

mining said survey data at regular intervals in a batch fashion; and triggering a notification to an asset coordinator regarding results of said mining of said survey data.

14. The system of claim 8 wherein said database comprises a database of a Relational Database Management System (RDBMS).

15. A non-transitory storage medium programmed to store a set of instructions for identifying and locating assets in a system to improve a performance of said system, the set of instructions to direct a computer system to perform acts of:

transmitting data at regular intervals from a client to a server for processing by said server and storage in a database associated with said server, said data including heuristics related to at least one asset of a system and information that characterizes a behavior of a user with respect to said at least one asset of said system, wherein said at least one asset communicates electronically with said server;

determining based on said data in said database including said heuristics and said information that characterizes said behavior of said user, an indication of a status of said at least one asset, wherein said indication includes said status of said at least one asset based on said heuristics; and utilizing said indication of said status to assist in determining if said at least one asset is being under-utilized in said system and in improving a performance of said system and identifying and locating said at least one asset of said system;

when said indication is determined, transmitting to said user a survey notification containing at least one electronic link to at least one survey in a graphically displayed survey form with questions for said user concerning a state and a location of said at least one asset, wherein survey data resulting from a completion and/or a partial completion of said at least one survey is mined for information that assists in said determining if said at least one asset is being under-utilized in said system and in said identifying and said locating said at least one asset;

mining said survey data at regular intervals in a batch fashion;

triggering a notification to an asset coordinator regarding results of said mining of said survey data, wherein said at least one asset comprises at least one printer among a plurality of printers and wherein said heuristics include:

heuristics indicating that no users have sent print jobs to said at least one printer within a given time span;

heuristics indicating that one or more users of said at least one printer have experienced errors when sending print jobs to said at least one printer;

heuristics indicating that a group of users have deleted said at least one printer;

heuristics indicating that an IP subnet associated with said at least one printer has changed;

heuristics indicating that an IP gateway associated with said at least one printer has changed;

heuristics indicating that said at least one printer has sent a power off message and does not send a boot up message after a particular amount of time;

heuristics indicating that a pool of users sending print jobs to said at least one printer has significantly changed over a period of time; and heuristics indicating that at least one user has changed a default associated with said at least one printer.

16. The non-transitory storage medium of claim 15 wherein said heuristics include information regarding whether or not an IP subnet and an IP gateway associated with said at least one asset have been changed and wherein said indication of said status of said at least one asset comprises an indication that said at least one asset has been moved added, changed, or disposed, which assists in said determining if said at least one asset is being under-utilized in said system.

17. The non-transitory storage medium of claim 15 wherein said data in said database is mined by data mining to assist in said determining if said at least one asset is being under-utilized in said system and in said identifying and said locating of said at least one asset of said system, wherein said data mining comprises a computational process of discovering patterns in said data including data sets within said data for extraction of information from the data set and transformation of the data set into an understandable structure for further use.

18. The non-transitory storage medium of claim 17 said data mining comprises an analysis step of a Knowledge Discovery in Database (KDD) process and wherein said data to be mined includes:
- a meter volume associated with said at least one asset;
- a device remote alert associated with said at least one asset;
- a change in network connectivity with respect to said at least one asset;
- a change in a default status of said at least one asset; and
- a recordable event associated with said at least one asset.

19. The non-transitory storage medium of claim 15, wherein said database comprises a database of a Relational Database Management System (RDBMS).

20. The non-transitory storage medium of claim 19, wherein said at least one asset comprises a multi-function device (MFD).

* * * * *